(12) United States Patent
Vanderleest (10) Patent No.: US 12,071,904 B2
(45) Date of Patent: Aug. 27, 2024

(54) SYSTEMS AND METHODS FOR BLEED VALVE TESTING IN GAS TURBINE ENGINES

(71) Applicant: Mitsubishi Power Aero LLC, Glastonbury, CT (US)

(72) Inventor: Ruurd Vanderleest, Vernon, CT (US)

(73) Assignee: Mitsubishi Power Aero LLC, Glastonbury, CT (US)

( * ) Notice: Subject to any disclaimer, the term of this patent is extended or adjusted under 35 U.S.C. 154(b) by 30 days.

(21) Appl. No.: 17/969,415

(22) Filed: Oct. 19, 2022

(65) Prior Publication Data

US 2024/0133348 A1 Apr. 25, 2024
US 2024/0229725 A9 Jul. 11, 2024

(51) Int. Cl.
*F02C 9/18* (2006.01)

(52) U.S. Cl.
CPC ............ *F02C 9/18* (2013.01); *F05D 2220/32* (2013.01); *F05D 2220/76* (2013.01); *F05D 2270/335* (2013.01)

(58) Field of Classification Search
CPC ............ F05D 2220/32; F05D 2220/76; F05D 2270/335; F16K 37/00; F16K 37/0075
See application file for complete search history.

(56) References Cited

U.S. PATENT DOCUMENTS

| | | | |
|---|---|---|---|
| 6,921,244 B2 | 7/2005 | Johnson | |
| 7,843,354 B2 | 11/2010 | Holt et al. | |
| 8,191,409 B2 | 6/2012 | Bacio | |
| 11,111,814 B2 | 9/2021 | Jastrzembowski et al. | |
| 2008/0238698 A1* | 10/2008 | Holt .................. | F02C 9/18 340/611 |
| 2013/0131951 A1* | 5/2013 | Pandey .................. | F01D 5/141 701/100 |
| 2018/0357840 A1* | 12/2018 | Gansler .................. | B64D 27/10 |

* cited by examiner

*Primary Examiner* — Todd E Manahan
*Assistant Examiner* — Rodolphe Andre Chabreyrie
(74) *Attorney, Agent, or Firm* — Schwegman Lundberg & Woessner, P.A.

(57) ABSTRACT

A controller for a gas turbine engine comprises a fuel flow sensor interface for receiving input signals indicative of a fuel flow into a combustor, a power output sensor interface for receiving input signals indicative of power output of an electrical generator driven via the gas turbine engine, a bleed valve interface for providing an output signal to a bleed valve that controls bleed air to vent a compressor of the gas turbine engine, and memory having stored therein instructions for determining functionality of the bleed valve based on evaluating efficiency of the gas turbine engine when the output signal is issued. A method comprises sensing efficiency of a gas turbine engine in response to actuation of a compressor bleed valve, comparing the efficiency to baseline efficiency, and outputting indicia of a differential between the efficiency and the baseline efficiency as an indication of operability of the first bleed valve.

19 Claims, 6 Drawing Sheets

SYSTEMS AND METHODS FOR BLEED VALVE TESTING IN GAS TURBINE ENGINES

TECHNICAL FIELD

This document pertains generally, but not by way of limitation, to gas turbine engines used to drive electrical generators, such as those used in combined-cycle power plants. More specifically, but not by way of limitation, the present application relates to systems and methods for testing operability of gas turbine engine systems, such as compressor systems.

BACKGROUND

Gas turbine engines operate by passing a volume of gases through a series of compressors and turbines in order to produce rotational shaft power. High energy gases rotate a turbine to generate the shaft power. The shaft power drives a compressor to provide compressed air to a combustion process that generates the high energy gases for turning the turbine. In an aircraft engine, the turbine can be used to generate propulsion, such as directly via thrust, or indirectly via a shaft and fan or propeller. In an industrial gas turbine, the shaft power can drive a generator that produces electricity. Alternatively, a power turbine driven by the high energy gases can be used to drive a shaft for powering the generator.

Each compressor and turbine includes a plurality of stages of stator vanes (also known as nozzles or stators) and rotor blades (also known as buckets), each vane and blade including an airfoil. In general, vanes redirect the trajectory of gases coming off the blades for flow into the next stage. In the compressor, vanes convert kinetic energy of moving gases into pressure, while, in the turbine, vanes accelerate pressurized gases to extract kinetic energy. In the compressor, the rotating blades push gases past the stationary vanes. In the turbine, the rotating blades extract rotational power from flowing gases.

Gas turbine engines typically operate most efficiently when all of the air entering the compressor and passing by the vanes and blades is passed into the combustor and turbine via a sealed passageway. However, sometimes it is desirable to vent air from the compressor through bleed valves for different purposes, such as to cool the aforementioned vanes and blades. Furthermore, it can be advantageous to bleed compressor air during different operating states of the gas turbine engine. For example, it can be desirable to vent compressor air during start-up or shut-down of the gas turbine engine to improve operational stability during periods of sub-maximum output.

Discussion of bleed valve operation can be found in U.S. Pat. No. 6,921,244 to Johnson, titled "Bleed Valve System"; U.S. Pat. No. 7,843,354 to Holt et al., titled "Activation Sensing"; U.S. Pat. No. 8,191,409 to Bacic, titled "Valve Failure Detection"; and U.S. Pat. No. 11,111,814 to Jastrzembowski, et al., titled "Turbine Engine Operational Testing."

OVERVIEW

The present inventor has recognized, among other things, that problems to be solved in the operation of gas turbine engines involve the failure of bleed valves. Sometimes bleed valves can become inoperable or incapacitated for various reasons. For example, sometimes electrical power to the bleed valve can be cut-off or a mechanical failure can occur in the bleed valve. Thus, if a bleed valve remains undesirably stuck in an open position, the operating efficiency of the gas turbine engine can be adversely affected. Similarly, if a bleed valve remains undesirably stuck in a closed position, the ability of the gas turbine engine to operate at part-load, e.g., start-up and shut-down, will be adversely affected. However, an inoperable bleed valve may be unknown to an operator of the gas turbine engine. For example, a bleed valve may only be opened for a short time during start-up or shut-down of the gas turbine engine, thereby providing only a short window in which the inoperable bleed valve might be detected. Furthermore, if a bleed valve is stuck in a partially-opened position, the resulting smaller impact to operating efficiency might not be noticed for a period of time.

The present subject matter can provide solutions to these problems and other problems, such as by providing systems and methods for determining the operability of gas turbine engine bleed valves. The present disclosure can utilize a controller to monitor efficiency of a gas turbine engine in response to the actuation, e.g., opening or closing, of a bleed valve. One or more bleed valves can be deliberately actuated to monitor for an immediate or near immediate response to the efficiency. If an efficiency change, e.g., an efficiency drop, is sensed, the controller can verify that the bleed valve changed state, e.g., opened. If an efficiency change is not sensed, the controller can verify that the bleed valve did not change state. Furthermore, bleed valves stuck in a partially-opened state can be determined by comparing efficiency responses to actuation of multiple bleed valves within a single compressor stage. Efficiency of the gas turbine engine can be calculated utilizing a real power sensor at the electrical generator driven by the gas turbine engine and a flow meter on a fuel line for fuel flowing into the gas turbine engine. The controller can include buttons to manually open or close a bleed valve on demand to facilitate testing.

In an example, a controller for a gas turbine engine comprises a fuel flow sensor interface for receiving input signals indicative of a fuel flow into a combustor of the gas turbine engine, a power output sensor interface for receiving input signals indicative of power output of an electrical generator driven by the gas turbine engine, a bleed valve interface for providing an output signal to a first bleed valve that controls bleed air to vent a compressor of the gas turbine engine, and memory having stored therein instructions for determining functionality of the first bleed valve based on evaluating efficiency of the gas turbine engine when the output signal is issued.

In another example, a method of determining functionality of compressor bleed valves in a gas turbine engine can comprise operating a gas turbine engine to compress gas with a compressor, driving an electrical generator via the gas turbine engine, actuating a first bleed valve of the compressor, sensing a first test efficiency of the gas turbine engine in response to actuation of the first bleed valve, comparing the first test efficiency to a baseline efficiency of the gas turbine engine, and outputting an indication of a differential between the first test efficiency and the baseline efficiency as an indication of operability of the first bleed valve.

In an additional example, a system for determining functionality of bleed valves in a gas turbine engine can comprise a fuel flow sensor configured to sense a flow rate of fuel within the gas turbine engine, a power sensor configured to sense electrical power generated by an electrical generator driven by the gas turbine engine, a first bleed valve connected to a first stage of a compressor of the gas turbine engine, a user interface device configured to open the first bleed valve based on a user input, a controller electronically connected to the fuel flow sensor, the power sensor and the first bleed valve, the controller configured to determine functionality of the first bleed valve based on sensed inputs from the fuel flow sensor and the power sensor, and a display screen configured to provide a graphical representation of the functionality of the first bleed valve.

This overview is intended to provide an overview of subject matter of the present patent application. It is not intended to provide an exclusive or exhaustive explanation of the invention. The detailed description is included to provide further information about the present patent application.

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
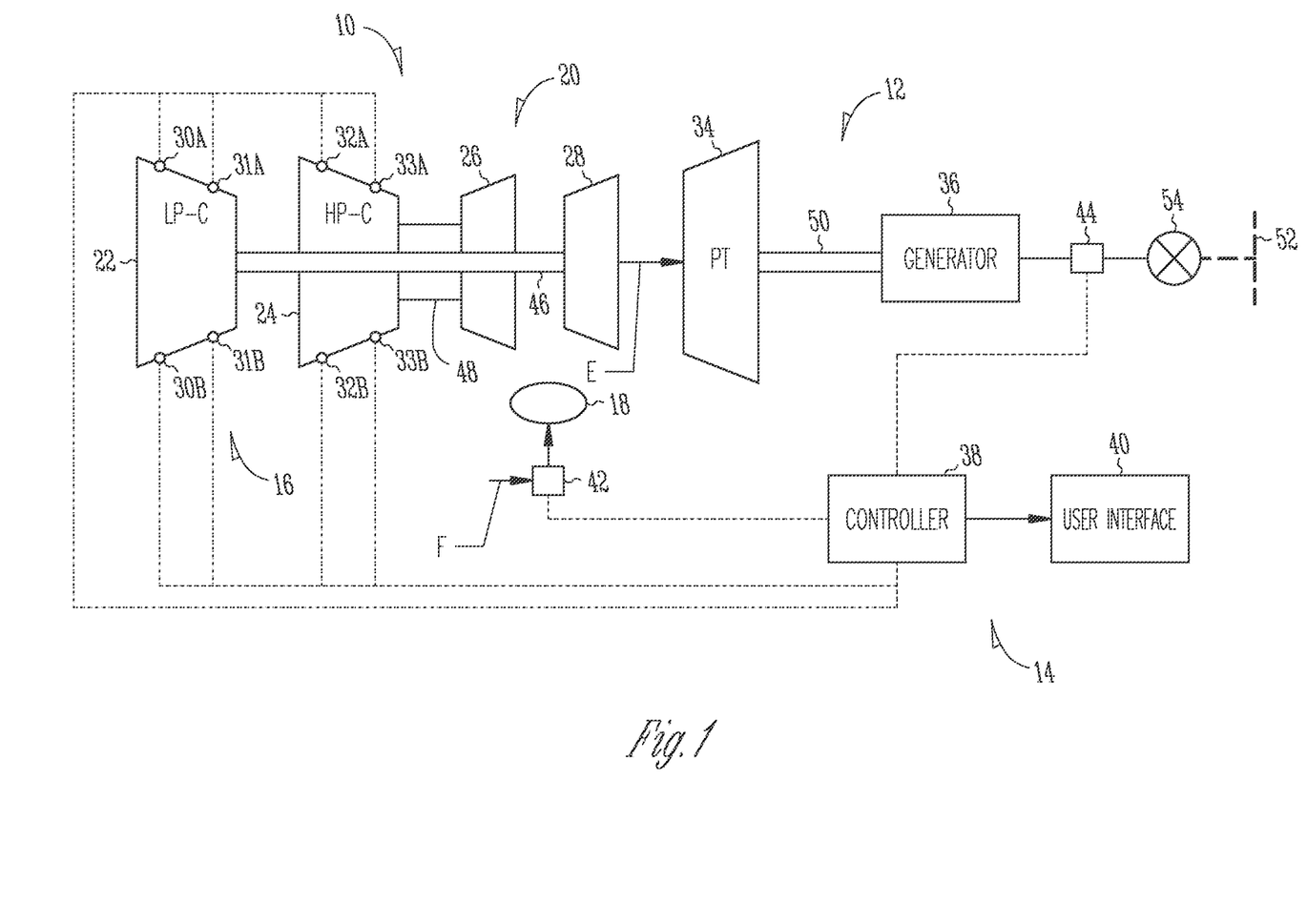
FIG. 1 is a schematic diagram illustrating a gas turbine engine connected to an electrical generator and a bleed valve testing system of the present disclosure.

FIG. 1 is a schematic diagram illustrating gas turbine engine 10, power generator 12 and bleed valve testing system 14 of the present disclosure. Gas turbine engine 10 can comprise compressor section 16, combustor 18 and turbine section 20. Compressor section 16 can comprise low-pressure compressor 22 and high-pressure compressor 24. Turbine section 20 can comprise high-pressure turbine 26 and low-pressure turbine 28. Low-pressure compressor 22 can comprise bleed valves 30A, 30B, 31A and 31B and high-pressure compressor 24 can comprise bleed valves 32A, 32B, 33A and 33B. Power generator 12 can comprise power turbine 34 and electrical generator 36. Bleed valve testing system 14 can comprise controller 38, user interface 40, fuel flow sensor 42 and power sensor 44. Bleed valves 30A-33B can additionally be connected to controller 38 via appropriate communication lines. Low-pressure compressor 22 can be connected to low-pressure turbine 28 by shaft 46 and high-pressure compressor 24 can be connected to high-pressure turbine 26 by shaft 48. Power turbine 34 can be connected to electrical generator by shaft 50. Electrical generator 36 can provide power to grid 52, depending on whether breaker 54 is open or closed.

Gas turbine engine 10 can operate by compressing air within compressor section 16 and burning fuel F within the compressed air in combustor 18 to generate high energy gases that pass through turbine section 20 to produce rotational shaft power to drive compressor section 16, as is known in the art. The high energy gases can additionally leave turbine section 20 as exhaust gas E to enter power turbine 34 to produce rational shaft power to turn electrical generator 36, as is known in the art.

In examples, gas turbine engine 10 and power generator 12 can comprise a simple-cycle system in which turbine section 20 directly generates electrical power with electrical generator 36 without integration into a combined cycle power plant that utilizes, for example, a Heat Recovery Steam Generator (HRSG) (not shown). Exhaust gas of gas turbine engine 10 can, thus, be vented to atmosphere, such as after being treated for emissions, such as by using a Selective Catalytic Reduction (SCR) system (not shown). In other examples, gas turbine engine 10 can be co-operated with other gas turbines that drive other electrical generators. Additionally, in other configurations, gas turbine engine 10 can be used in a combined-cycle system such as with a HRSG to utilize hot exhaust gas from gas turbine engine 10 to produce gas, such as steam, for driving an additional turbine that can drive an additional electrical generator.

Low-pressure compressor 22 and high-pressure compressor 24 can each comprise a plurality of stages of stationary vanes and rotating blades distributed over a circumference of each stage. Later stages of the compressor can become progressively smaller than earlier stages, thereby providing sequential increases in pressure from stage to stage. Pressure within each stage can be approximately the same regardless of circumferential position.

Bleed valve 30A and bleed valve 30B can be located at the same stage of low-pressure compressor 22, but at different circumferential positions. Likewise, bleed valve 31A and 31B can be located at the same stage of low-pressure compressor 22, but at different circumferential positions. As such, pressure at bleed valves 30A and 30B can be the same and pressure at bleed valves 31A and 31B can be the same, and pressure at bleed valves 31A and 31B can be higher than pressure at bleed valves 30A and 30B.

Bleed valve 32A and bleed valve 32B can be located at the same stage of high-pressure compressor 24, but at different circumferential positions. Likewise, bleed valve 33A and 33B can be located at the same stage of high-pressure compressor 24, but at different circumferential positions. As such, pressure at bleed valves 32A and 32B can be the same and pressure at bleed valves 33A and 33B can be the same, and pressure at bleed valves 33A and 33B can be higher than pressure at bleed valves 32A and 32B.

Controller 38 can be connected to user interface 40. User interface 40 can comprise a device for receiving output of controller 38 and providing input to controller 38. Controller 38 can be configured to operate gas turbine engine 10. As such, controller 38 can be electronically coupled to various components of gas turbine engine, such as fuel flow valves, electrical actuators, ignitors and the like, such as via wireless or wired connections. In particular, controller 38 can be connected to fuel flow sensor 42 and power sensor 44. Fuel flow sensor 42 can provide an indication of fuel F flowing to combustor 18. In examples, fuel flow sensor 42 can comprise a flow meter. Power sensor 44 can provide an indication of the amount of electricity being generated by electrical generator 36. In examples, power sensor 44 can comprise a real power sensor. Data from fuel flow sensor 42 and power sensor 44 can be collected during various operating states of gas turbine engine 10 to provide an indication to an operator of gas turbine engine 10 about the operating state of gas turbine engine 10 via user interface 40 or other means. The efficiency of gas turbine engine 10 can, for example, be defined as the ratio of power output over fuel input. Similarly, the heat rate of gas turbine engine 10 can be defined as the ratio of fuel input over power output.

Controller 38 can additionally be connected to each of bleed valves 30A-33B. Controller 38 can be configured to issue commands to bleed valves 30A-33B to actuate bleed valves 30A-30B. For example, controller 38 can issue open or close commands to bleed valves 30A-33B. Controller 38 can automatically open any or all of bleed valves 30A-33B during pre-programmed schedules executed without direct user input stored in memory of controller 38. Controller 38 can also open any or all of bleed valves 30A-33B based on a direct user input to user interface 40.

In order to test or evaluate the operability or functionality of each of bleed valves 30A-33B, controller 38 can obtain a baseline efficiency for gas turbine engine 10. In examples, controller 38 can include a library of efficiency values for different operating states within memory of controller 38. Additionally, controller 38 can access values for the baseline efficiency of gas turbine engine 10 from a network connection to a database and the like. Such stored baseline efficiency values for different baseline efficiencies can be determined beforehand, a priori, via measurement, such as with fuel flow sensor 42 and power sensor 44. Additionally, controller 38 can determine a current baseline efficiency value for gas turbine engine 10 by performing an efficiency calculation based on input from fuel flow sensor 42 and power sensor 44. For example, before operations to evaluate bleed valves 30A-33B operability, controller 38 can take a reading from fuel flow sensor 42 to obtain a fuel flow value, take a reading from power sensor 44 to obtain a power output value, and then divide the power output value by the fuel flow value to obtain a calculated baseline efficiency value. Subsequent efficiency values calculated after various one of bleed valves 30A-33B are opened can be compared to a stored baseline efficiency value for the current operating state of gas turbine engine 10 or the calculated baseline efficiency value. As discussed with reference to FIGS. 2-3B, controller 38 can be configured to look at differences between an instantaneous efficiency of gas turbine engine 10 after one of bleed valves 30A-33B is opened to either a stored baseline efficiency value or a calculated baseline efficiency value to determine if the bleed valve is operating. Specifically, if the opened bleed valve is operating, controller 38 will notice (e.g., determine via calculation and/or comparison of data values) a nearly immediate drop in efficiency of gas turbine engine 10; however, if the opened bleed valve is not operating, controller 38 will not notice (e.g., determine via calculation and/or comparison of data values) a nearly immediate drop in efficiency of gas turbine engine 10.

Figure 2:
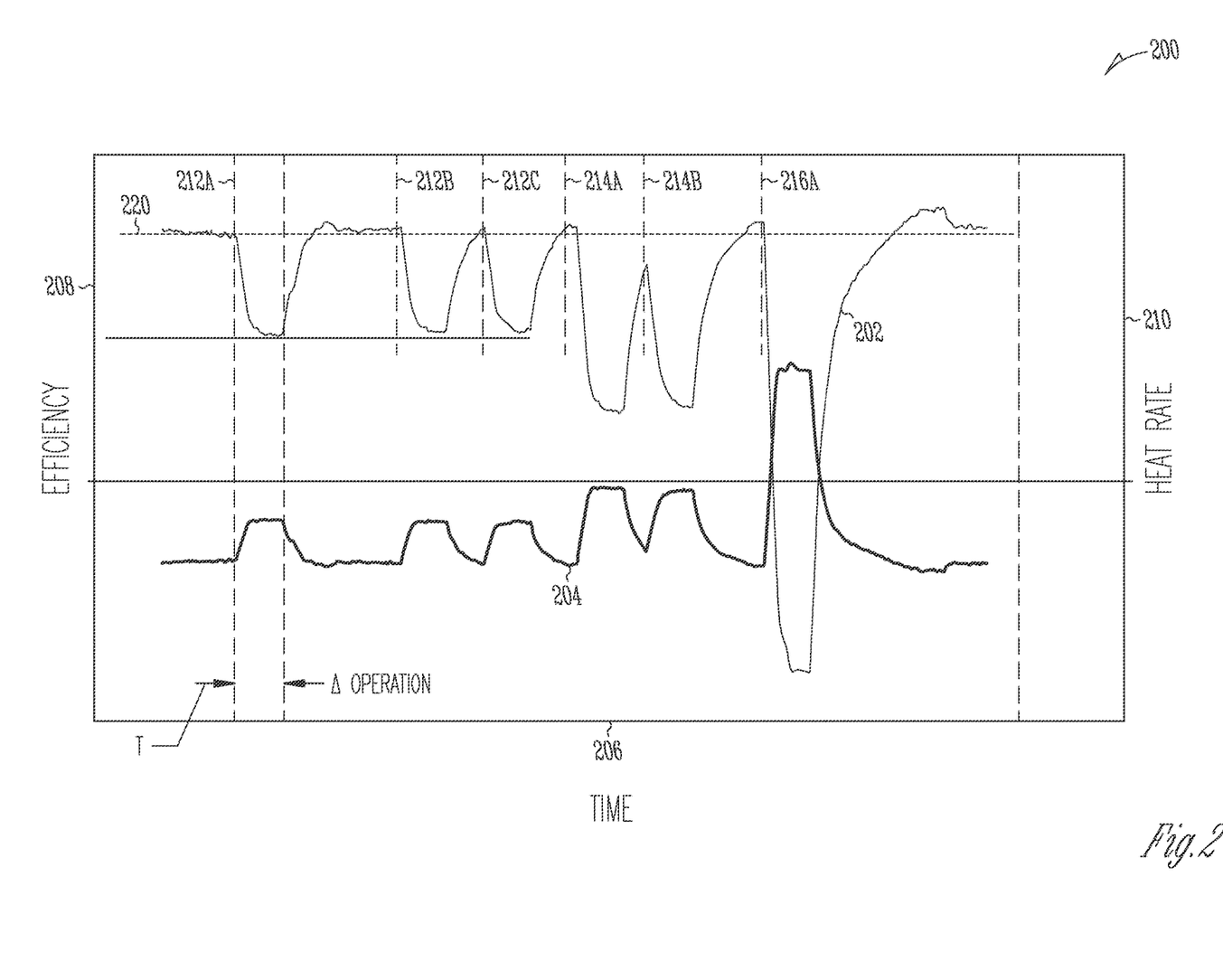
FIG. 2 is a graph showing a plot of gas turbine engine efficiency over time as various compressor bleed valves are opened and closed.

FIG. 2 illustrates graph 200 having plot 202 of gas turbine engine efficiency over time as various compressor bleed valves are opened and closed. Graph 200 also includes plot 204 of gas turbine engine heat rate. Graph 200 includes x-axis 206 indicating time, left y-axis 208 indicating efficiency and right y-axis 210 indicating heat rate. X-axis 206 can be demarcated in seconds. Left y-axis 208 can be demarcated in percentage. Right y-axis 210 can be demarcated in kJ/kWh.

Plot 202 includes several instances of a bleed valve opening on compressor section 16 of gas turbine engine 10 of FIG. 1. In particular, FIG. 2 shows bleed valves being opened at point 212A, point 212B, point 212C, point 214A, point 214B and point 216A.

Point 212A indicates when a first instance of a first type of bleed valve is opened. Point 212B indicates when a second instance of the first type of bleed valve is opened. Point 212C indicates when a third instances of the first type of bleed valve is opened. As such, points 212A-212C represent bleed valves located at different circumferential positions around the same compressor stage.

Point 214A indicates when a first instance of a second type of bleed valve is opened. Point 214B indicates when a second instance of the second type of bleed valve is opened. As such, points 214A and 214B represent bleed valves located at different circumferential positions around the same compressor stage.

Point 216A indicates when a first instance of a third type of bleed valve is opened. Points 212A-212C, points 214A and 214B and point 216A can be located at three different compressor states, respectively.

In examples, points 212A-212C can represent bleed valves 30A and 30B, points 214A and 214B can represent bleed valves 32A and 32B, and point 216A can represent one of valves 33A and 33B.

In FIG. 2, gas turbine engine 10 can be operating at a steady state condition, such as at base load, where efficiency is at level 220. Level 220 can represent a baseline efficiency. At point 212A, bleed valve 30A can be opened, such as via a command from controller 38 (FIG. 1). Bleed valve 30A can be opened for period T. In examples, period T can be in the range of approximately thirty seconds to approximately sixty seconds. As can be seen in FIG. 2, plot 202 immediately drops at point 212A after bleed valve 30A is opened. Plot 202 continues to drop for period T. After some amount of time, about half of period T, efficiency of gas turbine engine 10 can level-off as the effects of bleed valve 30A being open are stabilized by gas turbine engine 10, such as thermal stability. After period T, after operation of gas turbine engine 10 stabilizes, bleed valve 30A can return to a closed position and plot 202 begins to rise as the efficiency of gas turbine engine 10 begins to increase to return back to level 220. In examples, bleed valve 30A can return to a closed position by a command from controller 38 from a user as part of testing of bleed valve 30A. In additional examples, bleed valve 30A can return to a closed position by controller 38 as part of normal control of gas turbine engine 10, e.g., controller 38 can determine that gas turbine engine 10 is operating at base load wherein valve 30A should be closed and then issue a command to close bleed valve 30A to bring gas turbine engine 10 to operation at base load. To provide uniformity in testing when a bleed is commanded to open in testing a dwell time T at the open state is typically used. This period of time T also gives the gas turbine time to achieve thermal stability. After T is expired the command to the bleed to open then resumes its normal scheduling which at base load will be a command to close.

Because plot 202 dropped after controller 38 opened bleed valve 30A, controller 38 can determine that bleed valve 30A functioned properly to allow compressed air to leave low-pressure compressor 22. If plot 202 did not react to bleed valve 30A being opened, controller 38 can determine that bleed valve 30A is inoperable because, as dictated by the laws of thermodynamics, the efficiency of gas turbine engine 10 and plot 202 should correspondingly drop. In examples, controller 38 can evaluate the level of operability of bleed valve 30A by comparing the performance of bleed valve 30A to other bleed valves within the same stage of compressor section 16 as bleed valve 30A After bleed valve 30A is tested, controller 38 can test other bleed valves. At point 212B, bleed valve 30B can be tested. In examples, bleed valve 30B is opened at point 212B and, as can be seen in FIG. 2, plot 202 drops in a similar manner as when bleed valve 30A was opened at point 212A. As such, controller 38 can determine that bleed valve 30B functioned properly to open when requested by controller 38. Furthermore, controller 38 can determine that bleed valves 30A and 30B responded in the same or similar manner, thereby indicating that bleed valve 30A and bleed valve 30B are fully functioning. If, for example, one of bleed valve 30A and bleed valve 30B produced less of a drop in plot 202, that can be an indication that such bleed valve is only permitting a partial amount of bleed air to exit compressor section 16. This can be an indication of the bleed valve only partially opening, e.g., a mechanical malfunction, or there being a blockage of the bleed valve, e.g., from debris, corrosion, etc.

After bleed valve 30B is tested, controller 38 can test other bleed valves. At point 212C, another bleed valve on the same stage as compressor section 16 as bleed valves 30A and 30B can be tested. In examples, a bleed valve is opened at point 212C and, as can be seen in FIG. 2, plot 202 drops in a similar manner as when bleed valves 30A and 30B were opened at points 212A and 212B.

Point 214A and point 214B can indicate opening of two different bleed valves, i.e., on a different stage of compressor section 16, than those opened at points 212A-212C. In examples, points 214A and 214B can represent bleed valve 32A and bleed valve 32B (FIG. 1) being opened. As shown in FIG. 2, plot 202 reacted similarly, i.e., dropped, to bleed valves being opened at points 214A and 214B, indicating that bleed valve 32A and bleed valve 32B are both operating at full capacity.

Point 216A can indicate opening of a bleed valve different, i.e., on a different stage of compressor section 16, than those opened at points 212A-214B. In examples, point 216A can represent bleed valve 33A (FIG. 1) being opened. As shown in FIG. 2, plot 202 dropped in reaction to bleed valve 33A opening, indicating that bleed valve 33A is functioning.

Figure 3A:
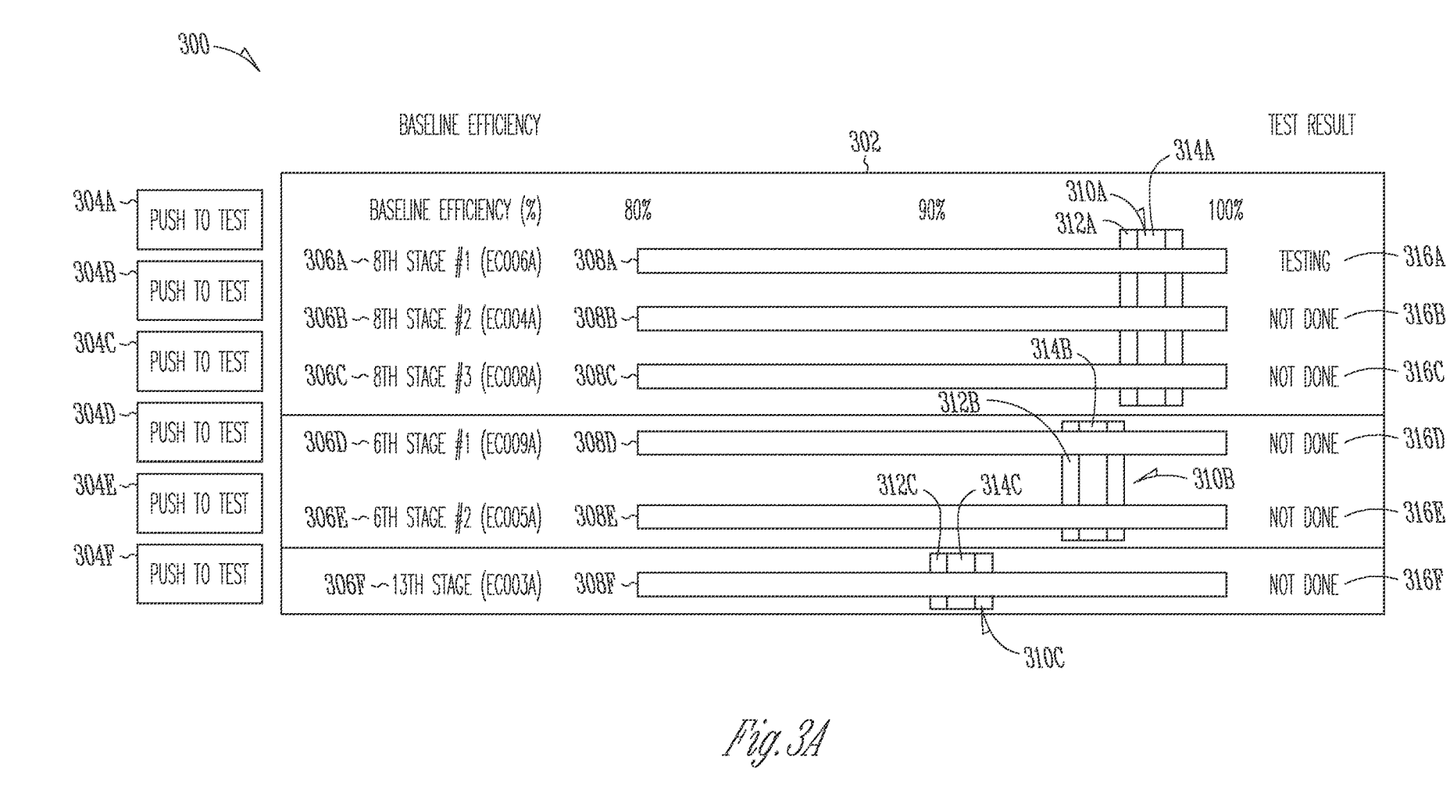
FIG. 3A is a schematic diagram illustrating a user interface for testing a plurality of different bleed valves in a compressor section of a gas turbine engine.

FIG. 3A is a schematic diagram illustrating user interface 300 for testing one or more of bleed valves 30A-33B in compressor section 16 of gas turbine engine 10. User interface 300 can comprise a graphical user interface having touch screen capabilities. In examples, user interface 300 can comprise an embodiment of user interface 40 of FIG. 1. User interface 300 can comprise test window 302 showing test bars for three different groupings of bleed valves. User interface 300 can include buttons 304A-304F, though fewer or greater numbers of buttons can be included. In examples, a button can be included for each bleed valve of compressor section 16. In examples, buttons 304A-304F can correspond to bleed valves associated with points 212A-216A of FIG. 2.

Test window 302 can further comprise descriptors 306A-306F for which valves each of buttons 304A-304F are configured to actuate, test bars 308A-308F for each of buttons 304A-304F, and response indicators 310A-310C for various groupings of test bars 308A-308F. Test bars 308A-308C can utilize response indicator 310A, test bars 308D and 308E can utilize response indicator 310B, and test bar 308F can utilize response indicator 310C. Response indicators 310A-310C can include acceptable ranges or bands 312A-312C and preferred ranges or bands 314A-314C, respectively. Test bars 308A-308F can additionally include status identifiers 316A-316F that provide in indication of the test performed or to be performed for each of buttons 304A-304F, respectively.

Figure 3B:
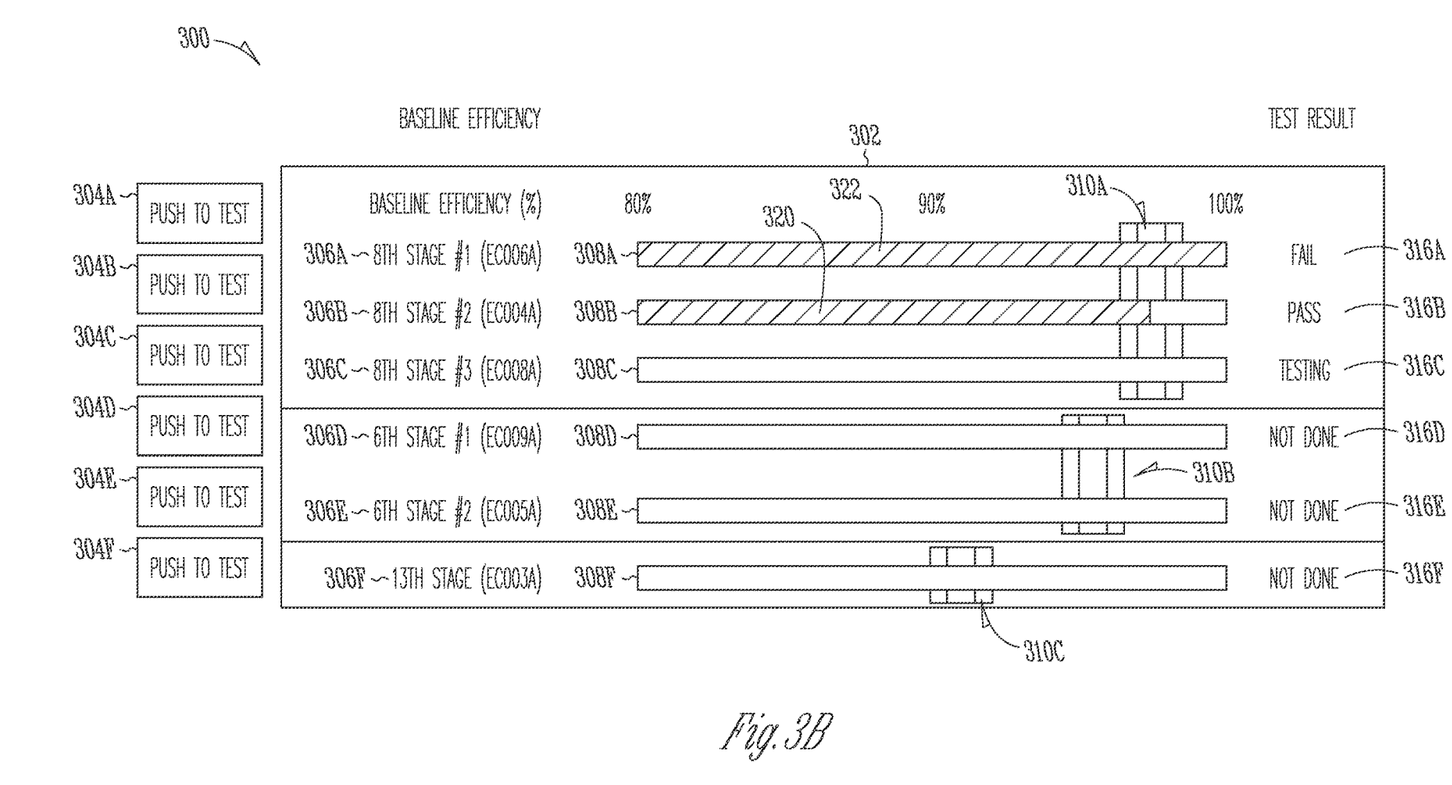
FIG. 3B is a schematic diagram illustrating the user interface of FIG. 3A after testing of a plurality of valves has been performed.

Test bars 308A-308F can correspond to a determined efficiency of gas turbine engine 10. Test bars 308A-308F can correspond to the magnitude of plot 202 in FIG. 2. In the illustrated example, the lefthand side of test bars 308A-308F can indicate 80% efficiency, the righthand side of test bars 308A-308F can indicate 100% efficiency and the middle of test bars 308A-308F can indicate 90% efficiency. As shown in FIG. 3B, each of test bars 308A-308F can be filled in partially or wholly after each of buttons 304A-304F is pressed to test an associated bleed valve, respectively.

FIG. 3B is a schematic diagram illustrating user interface 300 of FIG. 3A after testing of a plurality of valves has been performed. In FIG. 3B, a test has already been performed for the bleed valves associated with buttons 304A and 304B. As such, status identifiers 316A and 316B have been changed to indicate the test results. Test bar 308A has been filled in with result bar 320 and test bar 308B has been filled in with result bar 322.

As can be seen, result bar 320 completely fills in test bar 308A, thereby indicating that the efficiency of gas turbine engine 10 did not change, it remained at 100% of the baseline efficiency. As such, status identified 316A has changed to read "fail" because a non-changing efficiency of gas turbine engine 10 can indicate a malfunctioning, or non-opening, bleed valve, as described herein. The right end of result bar 320 falls outside of acceptable range 312A.

As can be seen, result bar 322 partially fills in test bar 308B, thereby indicating that the efficiency of gas turbine engine 10 did change, it dropped from 100% to approximately 97% of baseline efficiency. As such, status identified 316B has changed to read "pass" because a changing efficiency of gas turbine engine 10 can indicate a functioning, or operating, bleed valve, as described herein. Result bar 322 falls within acceptable range 312B. Furthermore, result bar 322 falls within preferred range 314B. If results bar 322 landed within acceptable range 312B, but not referred range 314B, such results can be an indication that tested bleed valve might not be sufficiently opening or might be opening too much, thereby indicating a potential partial malfunction or blockage.

Figure 4:
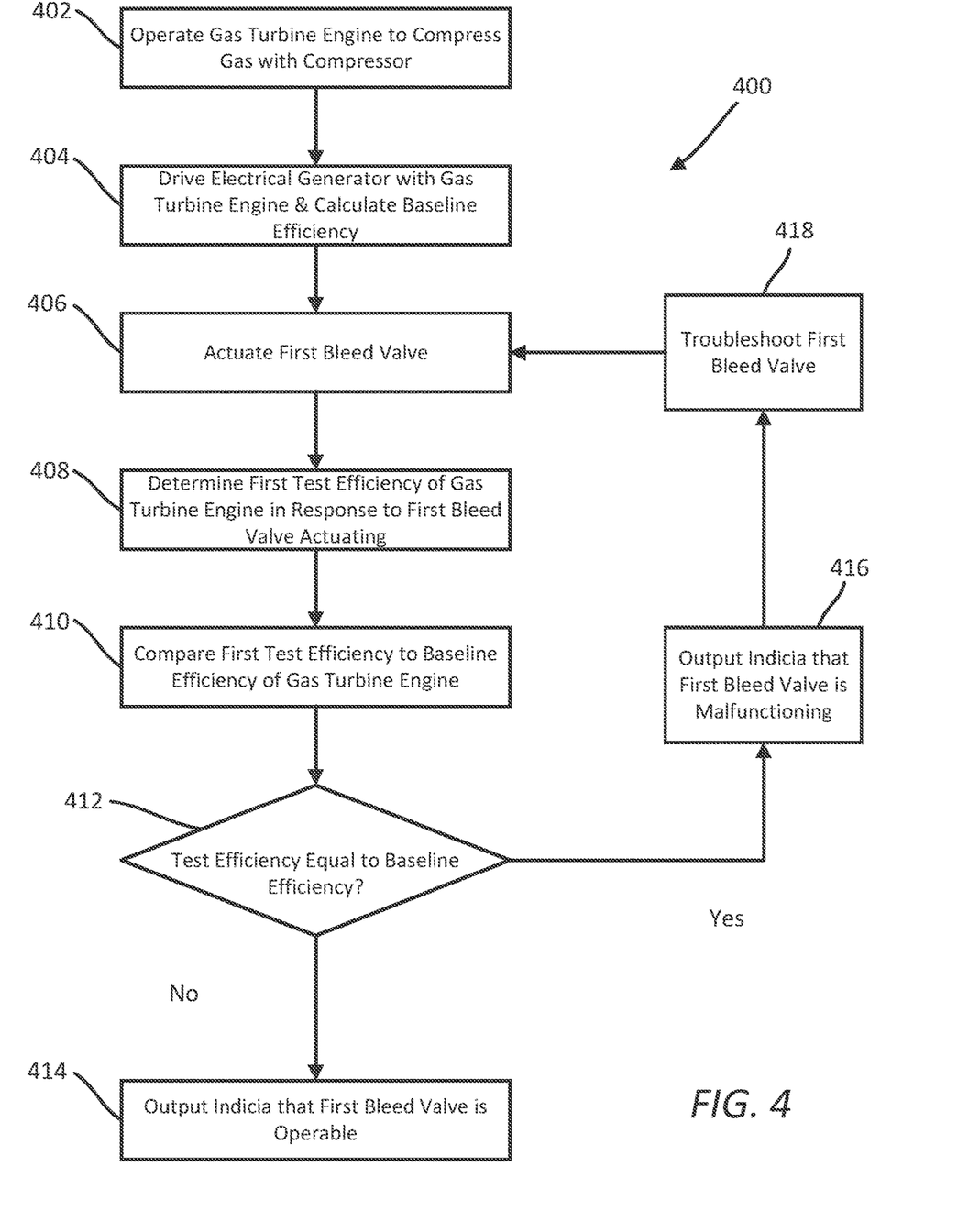
FIG. 4 is a line diagram illustrating operations of methods for testing bleed valves in a gas turbine engine according to the present disclosure.

FIG. 4 is a line diagram illustrating operations of method 400 for testing bleed valves 30A-33B in gas turbine engine 10 according to the present disclosure. Method 400 can comprise operation 402 through operation 418 that describe various procedures for obtaining efficiency data from a gas turbine engine to determine functionality of bleed valves 30A-33B of the present disclosure. In various examples, additional operations consistent with the systems, methods and operations described herein can be included, and some of operation 402-operation 418 can be omitted. Furthermore, operation 402-operation 418 can be performed in different orders than the illustrated example.

At operation 402, gas turbine engine 10 can be operated to compress air using compressor section 16. Air compressed in compressor section 16 can be mixed with fuel in combustor 18 and burned to produce exhaust gas E that drives turbine section 20.

At operation 404, electrical generator 36 can be driven via gas turbine engine 10. For example, exhaust gas E can drive power generator 12. In particular, exhaust gas E of gas turbine engine 10 can further drive power turbine 34 to produce electricity with electrical generator 36. Baseline efficiency can then be measured and retained for comparison.

At operation 406, one of bleed valves 30A-33B can be actuated. Controller 38 can send an electrical actuation signal to one of bleed valves 30A-33B to cause the bleed valve to change state. In example, controller 38 can cause bleed valves 30A-33B to open to test functionality or operability of such bleed valves. In examples, a signal from controller 38 can cause bleed valves 30A-33B to open and stay open. In examples, a signal from controller 38 can cause bleed valves 30A-33B to open only as long as the signal is being generated. A user can operate controller 38 to generate a signal to actuate one of bleed valves 30A-33B. In examples, one of buttons 304A-304F of FIGS. 3A and 3B can be pressed at user interface 300. Bleed valves 30A-33B can be tested as part of a routine maintenance operation whereby all of bleed valves 30A-33B can be systematically tested by controller 38 or one or more of bleed valves 30A-33B can be individually tested by a user on a case-by-case basis as needed. For example, operation 406 can be performed after an operator notices or detects a shift in the operating efficiency of gas turbine engine 10.

At operation 408, a first test efficiency of gas turbine engine 10 can be determined in response to one of bleed valves 30A-33B being opened at operation 406. The test efficiency can be determined by measuring fuel input to gas turbine engine 10 and power output of electrical generator 36 (FIG. 1). Specifically, controller 38 can simultaneously obtain readings from fuel flow sensor 42 and power sensor 44 immediately after one of bleed valves 30A-33B is commanded to be opened and thereafter divide the power output by the fuel input to obtain a test efficiency.

At operation 410, the first test efficiency determined at operation 408 can be compared to a baseline efficiency of gas turbine obtained at operation 404 by engine 10. In examples, the baseline efficiency can be stored in memory of controller 38, such as memory 504 or 506 of FIG. 5, as described above. In examples, the baseline efficiency can be the current operating state of gas turbine engine 10 that can be obtained with input from fuel flow sensor 42 and power sensor 44 before one of bleed valves 30A-33B is commanded to be opened. Comparison of the first test efficiency and the baseline efficiency can comprise subtracting one from the other to determine a differential. In examples, the first test efficiency is subtracted from the baseline efficiency to obtain a positive value or zero. In examples, controller 38 can automatically calculate the efficiency differential.

At operation 412, the efficiency differential can be compared to a predetermined reference value or range of values. In examples, controller 38 can automatically compare the efficiency differential to the reference value. In other examples, the predetermined value can have an absolute value greater than zero. The predetermined values can correspond to acceptable ranges 312A-312C and preferred ranges 314A-314C of FIGS. 3A and 3B.

If the differential, or the absolute value of the differential, is greater than zero, method 400 can proceed to operation 414.

If the differential, or the absolute value of the differential, is equal to zero, method 400 can proceed to operation 416.

At operation 414, the difference between the first test efficiency and the baseline efficiency can be greater than zero. As such, the efficiency of gas turbine engine 10 decreased in response to an actuation signal being sent to the one of bleed valves 30A-33B at operation 416, thereby reflecting operation, e.g., operability, of the tested bleed valve. Controller 38 can provide an output to an operator of gas turbine engine 10 to display or communicate the test result. For example, status identifiers 316A-316F (FIGS. 3A and 3B) can be used to provide visual text output (e.g., a graphical representation) indicative of the status of bleed valves 30A-33B, such as pass or fail. Thus, an operator can know that the bleed valve opened to vent compressed air from compressor section 16, thereby decreasing the efficiency of gas turbine engine 10. As such, an operator can continue to operate gas turbine engine 10 knowing the tested bleed valve is not problematic and can test other bleed valves or portions of gas turbine engine 10 to address any operating issues.

At operation 416, the difference between the first test efficiency and the baseline efficiency can be zero. As such, the efficiency of gas turbine engine 10 did not change in response to an actuation signal being sent to the one of bleed valves 30A-33B at operation 416, thereby reflecting non-operation or malfunction of the tested bleed valve. Controller 38 can provide an output to an operator of gas turbine engine 10 to display or communicate the test result. For example, status identifiers 316A-316F (FIGS. 3A and 3B) can be used to provide visual text output (e.g., a graphical representation) indicative of the status of bleed valves 30A-33B, such as pass or fail. Thus, an operator can know that the bleed valve did not open to vent compressed air from compressor section 16, which would have caused a decrease the efficiency of gas turbine engine 10. As such, an operator can troubleshoot the tested bleed valve, by testing electrical connections of the bleed valve to a power source or conducting visual inspections of the operation or opening of the bleed valve. If needed or desired, operation of gas turbine engine 10 can be stopped to troubleshoot, fix or replace the non-functioning bleed valve, to return operation of gas turbine engine 10 to properly functioning state.

Figure 5:
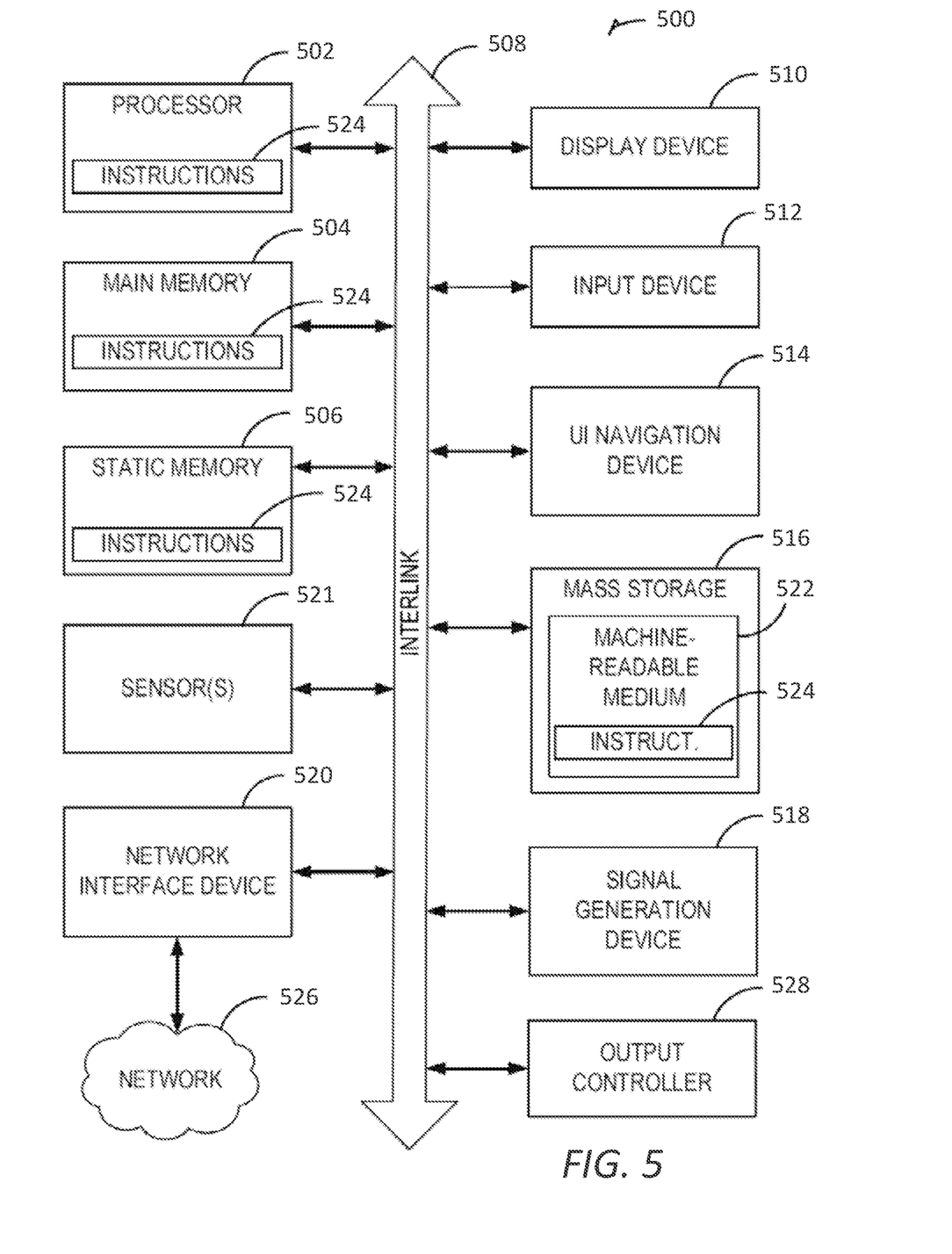
FIG. 5 is a schematic diagram illustrating components of a controller for operating a bleed valve testing system of the present disclosure.

FIG. 5 is a schematic diagram illustrating generally a block diagram of an example machine 500 upon which any one or more of the techniques (e.g., methodologies or operations) discussed herein can be performed. Portions of this description can apply to the computing framework of various portions of bleed valve testing systems in accordance with examples as discussed in this document. Machine 500 can comprise an example of controller 38 of FIG. 1. Machine 500 can be in communication with gas turbine engine 10, power generator 12, and grid 52, as well as other components, systems and controllers of a gas turbine engine power plant. As such, machine 500 can be configured to carryout and monitor compression processes within compressor section 16, combustion processes within combustor 18 and electrical power generated by electrical generator 36. Machine 500 can additionally be configured to carryout test and evaluation of gas turbine engine 10, including testing and evaluating bleed valve performance as described herein.

In examples, machine 500 can operate as a standalone device or can be connected (e.g., networked) to other machines. In a networked deployment, machine 500 can operate in the capacity of a server machine, a client machine, or both in server-client network environments. In an example, machine 500 can act as a peer machine in peer-to-peer (P2P) (or other distributed) network environment. Machine 500 can be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, can include, or can operate by, logic or a number of components, or mechanisms. Circuit sets are a collection of circuits implemented in tangible entities that include hardware (e.g., simple circuits, gates, logic, etc.). Circuit set membership can be flexible over time and underlying hardware variability. Circuit sets include members that can, alone or in combination, perform specified operations when operating. In an example, hardware of the circuit set can be immutably designed to carry out a specific operation (e.g., hardwired). In an example, the hardware of the circuit set can include variably connected physical components (e.g., execution units, transistors, simple circuits, etc.) including a computer readable medium physically modified (e.g., magnetically, electrically, movable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components can be used in more than one member of more than one circuit set. For example, under operation, execution units can be used in a first circuit of a first circuit set at one point in time and reused by a second circuit in the first circuit set, or by a third circuit in a second circuit set at a different time.

Machine (e.g., computer system) 500 can include hardware processor 502 (e.g., a central processing unit (CPU), a graphics processing unit (GPU), a hardware processor core, or any combination thereof), main memory 504 and static memory 506, some or all of which can communicate with each other via an interlink (e.g., bus) 508. Machine 500 can further include display unit 510 (e.g., a raster display, vector display, holographic display, etc.), alphanumeric input device 512 (e.g., a keyboard), and user interface (UI) navigation device 514 (e.g., a mouse). In an example, display unit 510, input device 512 and UI navigation device 514 can be a touch screen display. In examples, display unit 510, alphanumeric input device 512 (e.g., a keyboard), and user interface (UI) navigation device 514 (e.g., a mouse) can comprise or can be connected to user interface 300 of FIGS. 3A and 3B. Machine 500 can additionally include storage device (e.g., drive unit) 516, signal generation device 518 (e.g., a speaker), network interface device 520, and one or more sensors 521, such as a global positioning system (GPS) sensor, compass, accelerometer, or other sensors including fuel flow sensor 42 and power sensor 44 of FIG. 1. Machine 500 can include output controller 528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.). In examples, output controller 528 can provide actuation commands or instructions to bleed valves 30A-33B of FIG. 1.

Storage device 516 can include machine readable medium 522 on which is stored one or more sets of data structures or instructions 524 (e.g., software) embodying or utilized by any one or more of the techniques or functions described herein, such as the operations described with reference to FIG. 4. Instructions 524 can include machine readable instructions for operating user interface 300 of FIGS. 3A and 3B. Instructions 524 can also reside, completely or at least partially, within main memory 504, within static memory 506, or within hardware processor 502 during execution thereof by machine 500. In an example, one or any combination of hardware processor 502, main memory 504, static memory 506, or the storage device 516 can constitute machine readable media.

While machine-readable medium 522 is illustrated as a single medium, the term "machine readable medium" can include a single medium or multiple media (e.g., a centralized or distributed database, and/or associated caches and servers) configured to store the one or more instructions 524.

The term "machine readable medium" can include any medium that is capable of storing, encoding, or carrying instructions for execution by machine 500 and that cause machine 500 to perform any one or more of the techniques of the present disclosure, or that is capable of storing, encoding or carrying data structures used by or associated with such instructions. Non-limiting machine-readable medium examples can include solid-state memories, and optical and magnetic media. In an example, a massed machine-readable medium comprises a machine readable medium with a plurality of particles having invariant (e.g., rest) mass. Accordingly, massed machine-readable media are not transitory propagating signals. Specific examples of massed machine-readable media can include: non-volatile memory, such as semiconductor memory devices (e.g., Electrically Programmable Read-Only Memory (EPROM), Electrically Erasable Programmable Read-Only Memory (EPSOM)) and flash memory devices, magnetic disks, such as internal hard disks and removable disks; magneto-optical disks; and CD-ROM and DVD-ROM disks.

Instructions 524 can further be transmitted or received over communication network 526 using a transmission medium via network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as WiFi®, IEEE 802.16 family of standards known as WiMax®), IEEE 802.15.4 family of standards, peer-to-peer (P2P) networks, among others. In an example, network interface device 520 can include one or more physical jacks (e.g., Ethernet, coaxial, or phone jacks) or one or more antennas to connect to communication network 526. In an example, network interface device 520 can include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by machine 500, and includes digital or analog communications signals or other intangible medium to facilitate communication of such software.

VARIOUS NOTES & EXAMPLES

Example 1 is a controller for a gas turbine engine, the controller comprising: a fuel flow sensor interface for receiving input signals indicative of a fuel flow into a combustor of the gas turbine engine; a power output sensor interface for receiving input signals indicative of power output of an electrical generator driven by the gas turbine engine; a bleed valve interface for providing an output signal to a first bleed valve that controls bleed air to vent a compressor of the gas turbine engine; and memory having stored therein instructions for determining functionality of the first bleed valve based on evaluating efficiency of the gas turbine engine when the output signal is issued.

In Example 2, the subject matter of Example 1 optionally includes wherein the instructions for determining functionality of compressor bleed valves based on evaluating efficiency of the gas turbine engine when the output signal is issued comprise instructions for: operating the gas turbine engine to compress gas with the compressor; driving the electrical generator via the gas turbine engine; actuating the first bleed valve of the compressor in response to the output signal is issued; sensing a first test efficiency of the gas turbine engine in response to actuation of the first bleed valve; comparing the first test efficiency to a baseline efficiency of the gas turbine engine; and outputting an indication of a differential between the first test efficiency and the baseline efficiency as an indication of operability of the first bleed valve.

In Example 3, the subject matter of Example 2 optionally includes wherein comparing the first test efficiency to the baseline efficiency of the gas turbine engine comprises determining a difference between the first test efficiency and the baseline efficiency.

In Example 4, the subject matter of Example 3 optionally includes wherein outputting the indication of the differential between the first test efficiency and the baseline efficiency as the indication of operability of the first bleed valve comprises: outputting a pass indicator if there is a difference between the first test efficiency and the baseline efficiency; and outputting a fail indicator if there is no difference between the first test efficiency and the baseline efficiency.

In Example 5, the subject matter of any one or more of Examples 3-4 optionally include wherein outputting the indication of the differential between the first test efficiency and the baseline efficiency as the indication of operability of the first bleed valve comprises: a test efficiency results bar; and a band comprising an acceptable range in which an end of the test efficiency results bar should remain to indicate a properly function bleed valve.

In Example 6, the subject matter of any one or more of Examples 2-5 optionally include wherein the baseline efficiency comprises a current operating efficiency of the gas turbine engine when the first bleed valve is actuated.

In Example 7, the subject matter of any one or more of Examples 2-6 optionally include wherein the baseline efficiency comprises a predetermined operating state of the gas turbine engine having a predetermined efficiency value.

In Example 8, the subject matter of any one or more of Examples 2-7 optionally include wherein the instructions for determining functionality of compressor bleed valves based on evaluating efficiency of the gas turbine engine when the output signal is issued comprise instructions for: actuating a second bleed valve of the compressor; sensing a second test efficiency of the gas turbine engine in response to actuation of the second bleed valve; and comparing the second test efficiency to the first test efficiency to evaluate functionality of the first bleed valve and the second bleed valve.

In Example 9, the subject matter of Example 8 optionally includes wherein the functionality of the first bleed valve and the second bleed valve being evaluated comprises a partial opening state of one of the first bleed valve and the second bleed valve.

In Example 10, the subject matter of any one or more of Examples 8-9 optionally include wherein the first bleed valve and the second bleed valve are located at different circumferential positions within a single stage of the compressor.

In Example 11, the subject matter of any one or more of Examples 2-10 optionally include a user interface comprising: a button configured to open the first bleed valve; and a display screen configured to show a graphical representation of the indication of the differential between the first test efficiency and the baseline efficiency.

In Example 12, the subject matter of any one or more of Examples 1-11 optionally include wherein the instructions for determining functionality of compressor bleed valves based on evaluating efficiency of the gas turbine engine when the output signal is issued comprise instructions for: actuating the first bleed valve for approximately thirty seconds to approximately one minute to allow for thermal stabilization of the gas turbine engine.

In Example 13, the subject matter of any one or more of Examples 1-12 optionally include a fuel flow sensor connected to the fuel flow sensor interface; a power output sensor connected to the power output sensor interface; and a plurality of bleed valves connected to the bleed valve interface.

Example 14 is a method of determining functionality of compressor bleed valves in a gas turbine engine, the method comprising: operating a gas turbine engine to compress gas with a compressor; driving an electrical generator via the gas turbine engine; actuating a first bleed valve of the compressor; sensing a first test efficiency of the gas turbine engine in response to actuation of the first bleed valve; comparing the first test efficiency to a baseline efficiency of the gas turbine engine; and outputting an indication of a differential between the first test efficiency and the baseline efficiency as an indication of operability of the first bleed valve.

In Example 15, the subject matter of Example 14 optionally includes wherein sensing the first test efficiency of the gas turbine engine comprises: sensing a fuel flow input to the gas turbine engine; sensing a power output of the electrical generator; and dividing the power output by the fuel flow input.

In Example 16, the subject matter of Example 15 optionally includes wherein sensing the first test efficiency of the gas turbine engine comprises: sensing fuel flow input to the gas turbine engine using a fuel flow sensor; sensing power output of the electrical generator using a power output sensor; and dividing the power output by the fuel flow input.

In Example 17, the subject matter of any one or more of Examples 14-16 optionally include comparing efficiency of the gas turbine engine in response to a second bleed valve being actuated in order to determine partial operation of the first bleed valve and the second bleed valve.

In Example 18, the subject matter of any one or more of Examples 14-17 optionally include performing troubleshooting of the first bleed valve by performing at least one of: evaluating connection of the first bleed valve to a power source; and determining a mechanical operating condition of the first bleed valve.

In Example 19, the subject matter of any one or more of Examples 14-18 optionally include wherein actuating the first bleed valve of the compressor is executed after there is a detected shift in power output of the electrical generator.

Example 20 is a system for determining functionality of bleed valves in a gas turbine engine, the system comprising: a fuel flow sensor configured to sense a flow rate of fuel within the gas turbine engine; a power sensor configured to sense electrical power generated by an electrical generator driven by the gas turbine engine; a first bleed valve connected to a first stage of a compressor of the gas turbine engine; a user interface device configured to open the first bleed valve based on a user input; a controller electronically connected to the fuel flow sensor, the power sensor and the first bleed valve, the controller configured to determine functionality of the first bleed valve based on sensed inputs from the fuel flow sensor and the power sensor; and a display screen configured to provide a graphical representation of the functionality of the first bleed valve.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventor also contemplates examples in which only those elements shown or described are provided. Moreover, the present inventor also contemplates examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention is:

1. A controller for a gas turbine engine, the controller comprising:
    a fuel flow sensor interface for receiving input signals indicative of a fuel flow into a combustor of the gas turbine engine;
    a power output sensor interface for receiving input signals indicative of power output of an electrical generator driven by the gas turbine engine;
    a bleed valve interface for providing an output signal to a first bleed valve that controls bleed air to vent a compressor of the gas turbine engine; and
    memory having stored therein instructions for determining functionality of the first bleed valve based on evaluating efficiency of the gas turbine engine when the output signal is issued, wherein the instructions comprise instructions for:
        operating the gas turbine engine to compress gas with the compressor;
        driving the electrical generator via the gas turbine engine;
        actuating the first bleed valve of the compressor in response to the output signal being issued;
        sensing a first test efficiency of the gas turbine engine in response to actuation of the first bleed valve;
        comparing the first test efficiency to a baseline efficiency of the gas turbine engine; and
        outputting an indication of a differential between the first test efficiency and the baseline efficiency as an indication of operability of the first bleed valve.

2. The controller of claim 1, wherein comparing the first test efficiency to the baseline efficiency of the gas turbine engine comprises determining a difference between the first test efficiency and the baseline efficiency.

3. The controller of claim 2, wherein outputting the indication of the differential between the first test efficiency and the baseline efficiency as the indication of operability of the first bleed valve comprises:
    outputting a pass indicator if there is a difference between the first test efficiency and the baseline efficiency; and
    outputting a fail indicator if there is no difference between the first test efficiency and the baseline efficiency.

4. The controller of claim 2, wherein outputting the indication of the differential between the first test efficiency and the baseline efficiency as the indication of operability of the first bleed valve comprises:
    a test efficiency results bar; and
    a band comprising an acceptable range in which an end of the test efficiency results bar remains to indicate a properly function bleed valve.

5. The controller of claim 1, wherein the baseline efficiency comprises a current operating efficiency of the gas turbine engine when the first bleed valve is actuated.

6. The controller of claim 1, wherein the baseline efficiency comprises a predetermined operating state of the gas turbine engine having a predetermined efficiency value.

7. The controller of claim 1, wherein the instructions for determining functionality of compressor bleed valves based on evaluating efficiency of the gas turbine engine when the output signal is issued comprise instructions for:

actuating a second bleed valve of the compressor;
sensing a second test efficiency of the gas turbine engine in response to actuation of the second bleed valve; and
comparing the second test efficiency to the first test efficiency to evaluate functionality of the first bleed valve and the second bleed valve.

8. The controller of claim 7, wherein the functionality of the first bleed valve and the second bleed valve being evaluated comprises a partial opening state of one of the first bleed valve and the second bleed valve.

9. The controller of claim 7, wherein the first bleed valve and the second bleed valve are located at different circumferential positions within a single stage of the compressor.

10. The controller of claim 1, further comprising a user interface comprising:
a button configured to open the first bleed valve; and
a display screen configured to show a graphical representation of the indication of the differential between the first test efficiency and the baseline efficiency.

11. The controller of claim 1, wherein the instructions for determining functionality of compressor bleed valves based on evaluating efficiency of the gas turbine engine when the output signal is issued comprise instructions for:
actuating the first bleed valve for approximately thirty seconds to approximately one minute to allow for thermal stabilization of the gas turbine engine.

12. The controller of claim 1, further comprising:
a fuel flow sensor connected to the fuel flow sensor interface;
a power output sensor connected to the power output sensor interface; and
a plurality of bleed valves connected to the bleed valve interface.

13. A method of determining functionality of compressor bleed valves in a gas turbine engine, the method comprising:
operating the gas turbine engine to compress gas with a compressor;
driving an electrical generator via the gas turbine engine;
actuating a first bleed valve of the compressor;
sensing a first test efficiency of the gas turbine engine in response to actuation of the first bleed valve;
comparing the first test efficiency to a baseline efficiency of the gas turbine engine; and
outputting an indication of a differential between the first test efficiency and the baseline efficiency as an indication of operability of the first bleed valve.

14. The method of claim 13, wherein sensing the first test efficiency of the gas turbine engine comprises:
sensing a fuel flow input to the gas turbine engine;
sensing a power output of the electrical generator; and
dividing the power output by the fuel flow input.

15. The method of claim 14, wherein sensing the first test efficiency of the gas turbine engine comprises:
sensing the fuel flow input to the gas turbine engine using a fuel flow sensor;
sensing the power output of the electrical generator using a power output sensor; and
dividing the power output by the fuel flow input.

16. The method of claim 13, further comprising comparing efficiency of the gas turbine engine in response to a second bleed valve being actuated in order to determine partial operation of the first bleed valve and the second bleed valve.

17. The method of claim 13, further comprising performing troubleshooting of the first bleed valve by performing at least one of:
evaluating connection of the first bleed valve to a power source; and
determining a mechanical operating condition of the first bleed valve.

18. The method of claim 13, wherein actuating the first bleed valve of the compressor is executed after there is a detected shift in power output of the electrical generator.

19. A system for determining functionality of bleed valves in a gas turbine engine, the system comprising:
a fuel flow sensor configured to sense a flow rate of fuel within the gas turbine engine;
a power sensor configured to sense electrical power generated by an electrical generator driven by the gas turbine engine;
a first bleed valve connected to a first stage of a compressor of the gas turbine engine;
a user interface device configured to open the first bleed valve based on a user input;
a controller electronically connected to the fuel flow sensor, the power sensor and the first bleed valve, the controller configured to determine functionality of the first bleed valve based on sensed inputs from the fuel flow sensor and the power sensor;
a display screen configured to provide a graphical representation of the functionality of the first bleed valve; and
memory having stored therein instructions for determining functionality of the first bleed valve based on evaluating efficiency of the gas turbine engine when the user input is issued, wherein the instructions comprise instructions for:
operating the gas turbine engine to compress gas with the compressor;
driving the electrical generator via the gas turbine engine;
actuating the first bleed valve of the compressor in response to the user input being issued;
sensing a first test efficiency of the gas turbine engine in response to actuation of the first bleed valve;
comparing the first test efficiency to a baseline efficiency of the gas turbine engine; and
outputting an indication of a differential between the first test efficiency and the baseline efficiency as an indication of operability of the first bleed valve.

* * * * *